US006644816B1

(12) United States Patent
Perra et al.

(10) Patent No.: US 6,644,816 B1
(45) Date of Patent: Nov. 11, 2003

(54) DISPLAY DEVICE HAVING A CYLINDRICAL PROJECTION SURFACE SUCH THAT AN IMAGE PROJECTED ONTO THE INSIDE IS VISIBLE ON THE OUTSIDE

(75) Inventors: Antonio Guiseppe Perra, Alkmaar (NL); Johannes Quant, Heerhugowaard (NL)

(73) Assignee: Evolution Technology N.V., Curacao (NL)

( * ) Notice: Subject to any disclaimer, the term of this patent is extended or adjusted under 35 U.S.C. 154(b) by 0 days.

(21) Appl. No.: 09/720,605

(22) PCT Filed: Jun. 24, 1999

(86) PCT No.: PCT/NL99/00393

§ 371 (c)(1), (2), (4) Date: May 1, 2001

(87) PCT Pub. No.: WO00/00949

PCT Pub. Date: Jan. 6, 2000

(30) Foreign Application Priority Data

Jun. 26, 1998 (NL) ............................................ 1009506

(51) Int. Cl.[7] ........................ G03B 21/14; G03B 21/22; G03B 21/56; H04N 9/47; G02F 1/1335

(52) U.S. Cl. .......................... 353/119; 353/46; 353/79; 353/98; 353/99; 353/122; 348/36; 348/115; 359/451; 359/453; 359/457; 349/5

(58) Field of Search ............................ 353/119, 31, 94, 353/79, 98, 99, 122, 46, 80, 74; 349/5, 7, 8, 11; 348/36, 115; 359/451, 453, 457

(56) References Cited

U.S. PATENT DOCUMENTS

| | | | | | |
|---|---|---|---|---|---|
| 4,421,486 | A | * | 12/1983 | Baldwin et al. | 434/44 |
| 5,537,251 | A | * | 7/1996 | Shimada | 359/462 |
| 5,704,061 | A | | 12/1997 | Anderson | 396/330 |
| 5,920,375 | A | * | 7/1999 | Fahle et al. | 351/246 |
| 5,975,703 | A | * | 11/1999 | Holman et al. | 353/20 |
| 6,313,865 | B1 | * | 11/2001 | Driscoll, Jr. et al. | 348/36 |
| 6,327,020 | B1 | * | 12/2001 | Iwata | 352/69 |
| 2001/0040671 | A1 | * | 11/2001 | Metcalf | 353/94 |

* cited by examiner

*Primary Examiner*—Russell Adams
*Assistant Examiner*—Melissa J Koval
(74) *Attorney, Agent, or Firm*—Webb Ziesenheim Logsdon Orkin & Hanson, P.C.

(57) ABSTRACT

The invention relates to a display device for displaying visual information, comprising: at least one image-forming element; at least one light source for generating a light beam, which in cooperation with the image-forming element produces an illuminated image; optical means for processing the light beam and/or illuminated image; and a projection surface for receiving the illuminated image, wherein the image-forming element is flat and the projection surface forms at least a part of a cylinder wall.

17 Claims, 4 Drawing Sheets

DISPLAY DEVICE HAVING A CYLINDRICAL PROJECTION SURFACE SUCH THAT AN IMAGE PROJECTED ONTO THE INSIDE IS VISIBLE ON THE OUTSIDE

BACKGROUND OF THE INVENTION

1. Field of the Invention

The invention relates to a display device for displaying visual information according the preamble of claim 1.

2. Description of Prior Art

In the present information society there is a great need for displaying visual information such as for instance graphic material. Examples of display of visual information are for instance bill boards, information panels, screens and so on. Bill boards usually contain static (printed) information which may or may not take a multiple form in a determined advertising device for changing an advertising text. Information panels with changeable information are usually constructed from displaceable panel parts or individually controllable light pixels. Determined information cast be shown by displacing the panel parts and/or with or without activation of particular light pixels. The resolution of such panels is generally limited and the information they can contain is usually also limited (for instance only numbers and letters). A screen has the advantage that the possibilities for image formation appear virtually unlimited. A drawback here however is that the shape of a screen is substantially flat and either requires a considerable rear construction or has to be illuminated from a distance. The options for use are consequently limited.

The German Offenlegungsschrift DE 195 00 693 shows an advertising and information system with a cylindrical or conical projection surface to be connected with a ceiling. Inside the projection surface a dia or video projector is located. The dia or video projector is directly projecting an image on the projection surface by way of a mirror system. The dia or video projector is placed on a turntable by turning of which the projector can create a going around image on the projection screen.

The present invention has for its object to provide a display device for displaying visual information with which a great freedom in the form of images can be combined with flexibility in changing the images and a high quality of the images.

SUMMARY OF THE INVENTION

The invention provides for this purpose a display device for displaying visual information. The optical means preferably comprise at least a reflector which can take the form of at least a part of a conical surface or a pyramid. In addition, it is also possible to use an intermediate form of cone and pyramid, for instance a polygon. With such a display device an illuminated image can be displayed on a continuous way in a random size on a projection surface which has a curved shape of a cylinder shell. The continuous cylindrical projection of the image on the projection surface makes the image steady and more clear then when each part of the projection surface is lighted during only a period of time. Another advantage in relation to the projection device as disclosed in the German Gebrauchsmuster is that the device according the invention has no mechanically moving parts; this makes the device according the invention better in use (less noisy), more reliable and less liable of maintenance. Another advantage of such a projection surface is that it produces a very attractive appearance for a wide variety of applications, and not only for adjustment to a ceiling, such as for instance advertising pillars, video conferencing displays, virtual reality pillars etc. It is noted herein that as desired the inside or the outside is considered as the primary projection surface. In said application as advertising pillar, for instance at large events, fairs, in shopping centres, at stadiums and airports, particularly the outside of a pillar is the relevant projection surface. In an application as virtual reality pillar, use can in contrast be made of the inside of the cylinder wall as projection surface so that a person at least partially surrounded by the cylinder wall surface can undergo the illusion of being in a different environment. An additional option here can consist of embodying, at least a part of the projection surface as so-called 'touch screen', whereby the projected visual information can be changed by touching said screens. Owing to the entirely new concept of displaying visual information such as picture material with the display device according to the invention, many applications will become possible which do not exist at the moment. By embodying the optical means in the form of a reflector, the costs thereof can be limited. With a reflector in the shape of a cone or pyramid a simple construction can moreover be realized in combination with the cylinder wall-shaped projection surface. An additional advantage herein is that with said reflector shapes the distortion of the image created by the image-forming element is controllable.

The reflector is preferably disposed close to an end side surface of the cylinder defining the cylinder wall. By means of this construction a compact display device can be realized the whole cylinder wall of which can be utilized for displaying visual information.

In another preferred embodiment the image-forming element is coupled to a computer for control thereof. The control of the image-forming element enables changing of the projected images as desired. It is thus possible to adapt the visual information to an actual situation. It is also possible to display moving images with the image-forming element. Yet another option of the computerized control is the possibility of compensating the image created by the image-forming element on the optical means When the distortion of the optical means is known, it is possible by means of a standardized process to control the image-forming element such that the projected image acquires the desired form, The distortion of the optical means can thus be compensated by means of a standardized conversion. Yet another advantage of the control by means of computer is that the computer can be programmed by means of cables or a remote receiver such that the desired images are projected. Changing of the images for displaying can thus take place at a distance and makes it unnecessary to go to the display device.

In a preferred embodiment the image-forming element is formed by a light passage screen, such as for instance a display with liquid crystals, also referred to as liquid crystal display (L.C.D.). A variant hereof is referred to as ferro liquid display (F.L.D.). Such a light passage screen is preferably disposed between the light source and the optical means. Such a light passage screen is affordable and obtainable in both black-and-white and colour versions. The display device can be constructed very simply when the light source, for instance a projector, casts a light beam through the light passage screen whereby an illuminated image results which is subsequently directed onto the projection surface by the optical means. Such a display device can be manufactured for a significant part with components which are readily available. In practice the light passage screen will usually be placed in the projector so that it is situated between the light source and the lens of the projector. This solution is moreover compact and easy to install.

In another preferred embodiment the image-forming element is formed by a reflection surface built up of a plurality of parts, which parts can be individually positioned, such as for instance a digital mirroring device (D.M.D.). Such an image-forming element reflects light cast thereon, which reflected light forms an illuminated image. A D.M.D. can also be controlled using a computer. Such image-forming elements are also known under the name of digital light processing (D.L.P.).

The projection surface is preferably manufactured from a transparent material such that an image projected on the inside of the cylinder wall is visible on the outside of the cylinder wall. The image-forming element, the light source and the optical means are herein preferably all disposed substantially in the cylinder defined by the projection surface. Such a display device can be embodied such that the outside is cylindrical without associated components situated on the outside of the cylinder. This provides the display device with an aesthetically attractive appearance and enables use of the display device in a variety of environments. Depending on the choice of material for the cylinder wall and/or the arranging of a protective casing, the display device is vandal-proof. An additional advantage is that the projection means in such a display device take up no space outside the cylinder, which also increases the application possibilities.

In a particular preferred embodiment the display device is provided with a part of a reflecting sphere, via which the light cast by a projector is projected onto a projection surface in the form of a cylinder shell. Very favourable results can be achieved when such a device takes a multiple form in that two mutually facing parts of reflecting spheres are disposed in a projection surface in the form of a cylinder shell and have central openings arranged therein for passage of the light cast by two projectors. With such embodiments favourable results have obtained in practice been achieved in realizing bright images over the whole surface of a cylinder wall.

In order to increase the brightness of the image on the cylinder shell the projection surface is preferably formed by a cylindrical Fresnel lens. Such a construction is characterized by external grooves in the surface of the cylinder shell such that in cross-section a saw tooth-like structure is present with saw teeth mutually connecting in uniform manner. So as to limit the exit angle of the light particularly in vertical direction (i.e. parallel to the axis of the cylinder wall-shaped projection surface) the inner side of the cylindrical Fresnel lens, which is smooth, is covered in a preferred embodiment with a so-called high gain material. This results in more light in the remaining light cone and therefore in a sharper image by for instance a factor of 2. An example of a high gain material is holographic optical diffuser. The light cast by the Fresnel lens impinges on a diffuser screen placed round the lens.

The light from a projector is generally polarized linearly. Because the efficiency of a Fresnel lens is dependent upon polarization, considerable colour variations can occur during deflection of differently polarized light colours at relatively large angles, i.e. in the middle and at the edges of the cylinder shell. In order to eliminate this, use is preferably made of a depolarizing element placed between the projector and the part of the reflecting sphere. Examples hereof are; a $\frac{1}{4}\lambda$ plate, a wedge depolarizer and a Fresnel rhomb. Such an element provides the same degree of polarization (or the absence thereof) for all light colours, whereby colour variations no longer occur.

For protection purposes an outer cylinder is preferably placed round the projection surface in the form of a cylinder shell formed by the Fresnel lens and the diffuser screen placed therearound. When the inner or outer side of this outer cylinder is provided with a lenticular structure, it is ensured that light originating from the Fresnel lens is distributed from the cylinder shell particularly in a direction perpendicular to the axis, i.e. in horizontal direction when the cylinder is placed vertically.

BRIEF DESCRIPTION OF THE DRAWINGS

The present invention will be further elucidated with reference to non-limitative embodiments shown in the following figures. Herein.

DETAILED DESCRIPTION OF THE PREFERRED EMBODIMENTS IN THE CLAIMS

Figure 1:
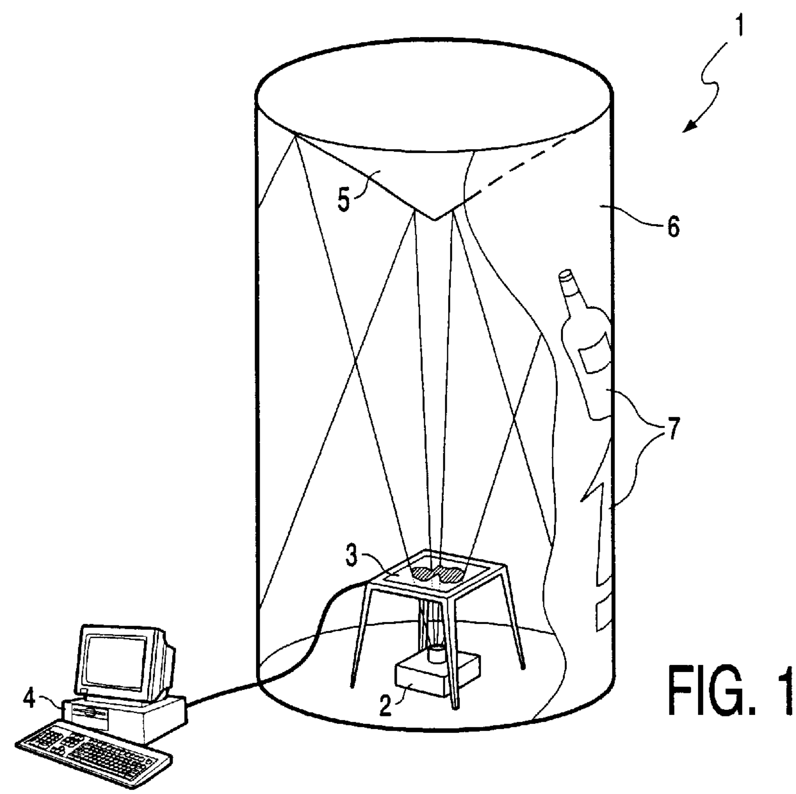
FIG. 1 shows a partly cut-away perspective view of a device according to the invention.
Figure 6:
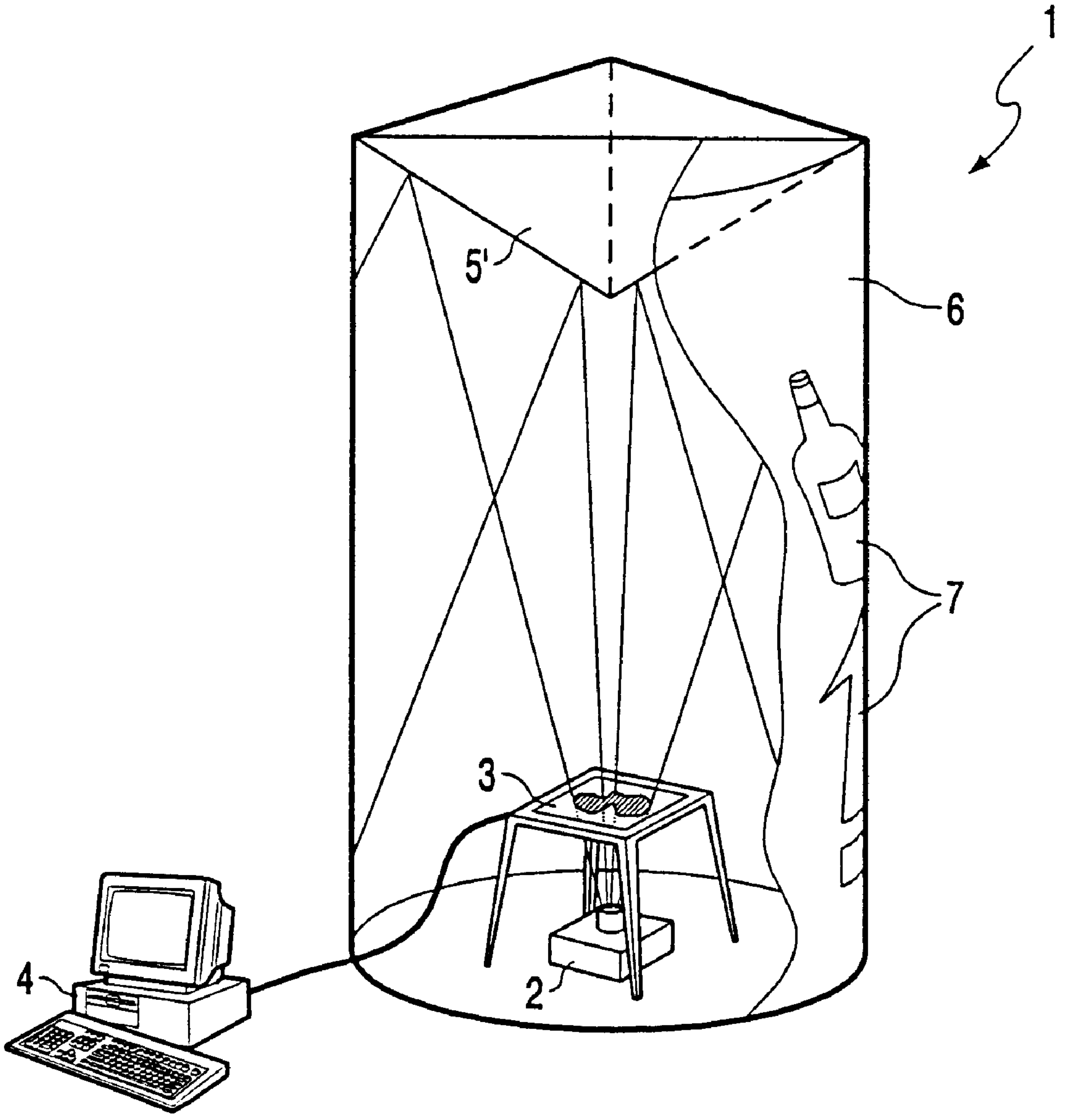
FIG. 6 shows a partly cut-away perspective view of an alternative embodiment of a device according to the invention.

FIG. 1 shows a display device 1 in which is disposed a projector 2. The light emitted by projector 2 is carried through a light passage screen 3. Light passage screen 3 is connected to a computer 4 so that the image on light passage screen 3 can be changed, continuously or not, in simple manner. The light carried through light passage screen 3 is projected onto a conical reflector 5 (pyramidal reflector 5' in FIG. 6), whereafter the reflected light is projected onto the inner side of a cylinder wall 6. This cylinder wall 6 is of a transparent material such that the image projected onto the inside thereof is visible on the outside. Images 7 are thus visible on the outer side of cylinder wall 6, subject to the image on light passage screen 3. It will be apparent that an image on light passage screen 3 will be distorted by the reflection by means of reflector 5 and the shape of cylinder wall 6. An added problem is that without correction the intensity of the illumination at the top of the cylinder wall 6 varies from the light intensity at the bottom of the cylinder wall 6. Both the distortion and the change of light and intensity can be compensated by means of intelligent control of light passage screen 3, as well as by the shape of screen 3. Display device 1 thus forms a pillar construction with the option of displaying images 7 as desired and optionally causing these to move or not over sylinder wall 6.

Figure 2:
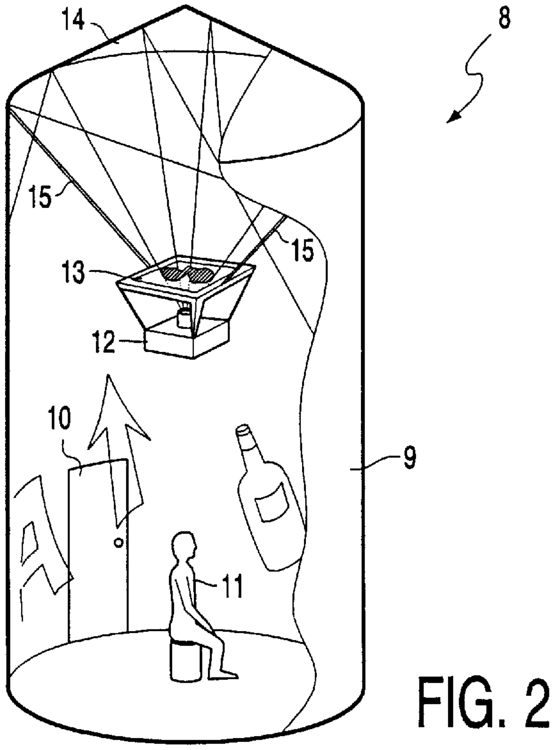
FIG. 2 shows a partly cut-away perspective view of an alternative embodiment of a device according to the invention.

FIG. 2 shows a display device 8. Device 8 consists of a cylinder construction 9 in which a door 10 is arranged to allow a viewer 11 into the inside of cylinder 9. A projector 12 is suspended in cylinder 9. The light emitted by projector 12 is carried through a light passage screen 13 and subsequently reflected by a reflector 14 against the inner side of cylinder construction 9. Light passage screen 13 must be connected to a computer for control purposes, which is not shown in this figure. Projector 12 and light passage screen 13 are suspended in cylinder 9 by means of connecting rods 15.

The shape of reflector 14 is conical and it is illuminated on the inside. The light reflected by reflector 14 is projected onto the inner wall of cylinder 9, which thus forms a projection surface. That is, the observation of display device 8 according to FIG. 2 takes place from the inside, in contrast to the observation in the case of display device 1 as shown in FIG. 1. The viewer 11 located in cylinder 9 can thus undergo a sensation wherein it seems as if he is in a different reality.

Figure 3:
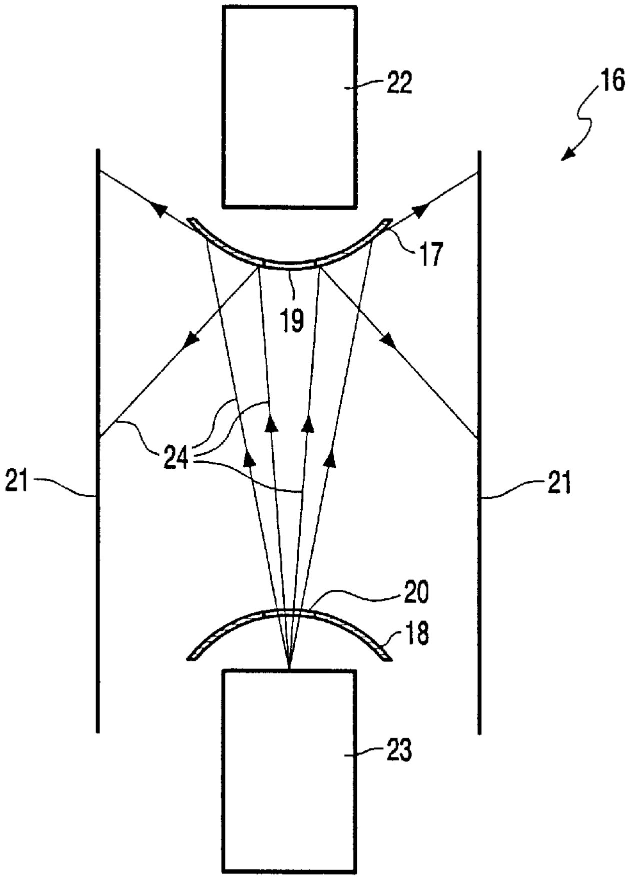
FIG. 3 shows a schematic cross-section through a preferred embodiment of the display device according to the invention.

FIG. 3 shows a display device 16 in which are arranged two parts of reflecting spheres 17, 18, both provided with a central opening 19, 20. The parts of the reflecting spheres 17, 18 are centrally disposed in a projection surface 21 in the form of a cylinder shell onto which two projectors 22, 23 cast images. Projector 22 thus casts an image on the part of the reflecting sphere 18 which is then reflected to the lower pat, in FIG. 3, of the projection surface 21 in cylinder shell form. Projector 23 casts light through opening 20 on the part of the reflecting sphere 17, which light is then reflected to the upper part of the projection surface 21 in cylinder shell form. This latter projection is shown schematically by means of light beams 24. Projectors 22, 23 thus preferably operate synchronously.

Figure 4:
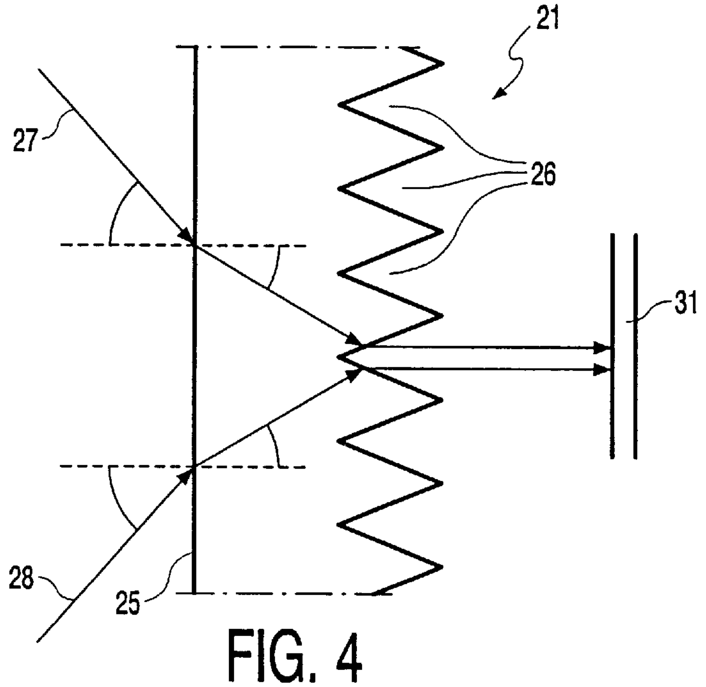
FIG. 4 shows a cross-section through a part of a projection surface in the form of a cylinder shell with "Fresnel structure"

FIG. 4 shows a cross-section through a part of the cylinder shell-shaped projection surge 21 wherein it can be seen clearly that the inner side 25 of the cylinder shell is smooth in contrast to the outer side of cylinder shell-shaped projection surface 21 provided with grooves 26. The "Fresnel structure" as shown in this figure has the advantage that light beams 27, 28 cast at different angles onto projection surface 21 are projected more or less perpendicularly to the axis of projection surface 21. The light intensity of the image on a diffuser screen 31 placed round projection surface 21 is thus enlarged relative to a projection surface smooth on two sides. The smooth inner side 25 is preferably also covered with a so-called high gain material, which is not shown in this figure.

Figure 5:
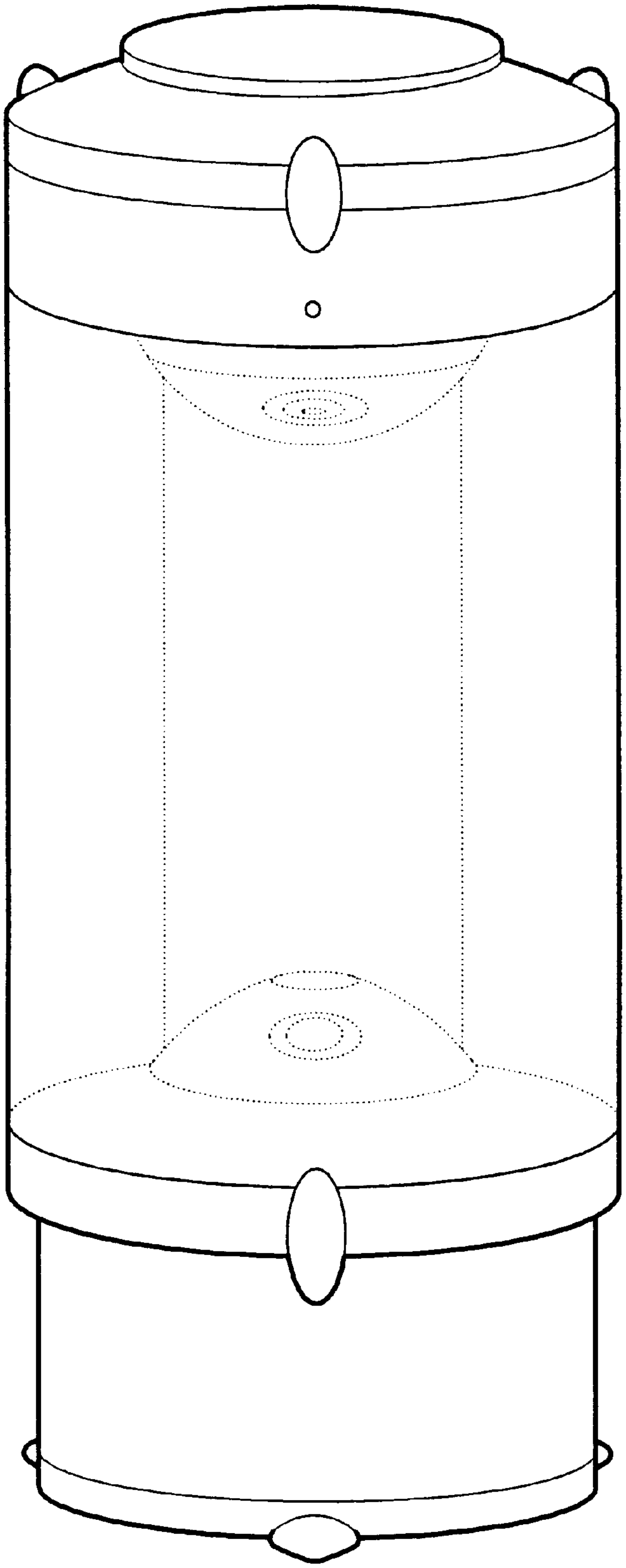
FIG. 5 shows a three-dimensional external view of the embodiment of the display device as shown schematically in FIG. 3.

Finally, FIG. 5 shows display device 16 in assembled state. An outer cylinder is herein preferably placed for protection purposes round the cylinder shell-shaped projection surface 21 and the cylindrical diffuser screen 31. Clearly shown are the parts of the reflecting spheres 17, 18 in which projectors 22, 23, not shown in his figure, are concealed. The whole unit as shown in FIG. 3 is placed on a foot 29 in which a part of the control is for instance arranged. The top of the projection surface is also finished in this case by means of a hood 30.

Although the invention is elucidated with reference to only a few embodiments, it will be apparent to all that the invention is in no way limited to the described and shown embodiments. On the contrary, many further variations are possible for the skilled person within the scope of the invention. It is thus possible to change the shape of the reflector, to provide the device with a plurality of reflectors, to employ different light sources for separate colours and/or projection surface parts, and so on.

What is claimed is:

1. A display device for displaying visual information, comprising:

at least one image-forming element;

at least one light source for generating a light beam, which in cooperation with the image-forming element produces an illuminated image;

optical means for processing the illuminated image; and a projection surface for receiving the illuminated image, wherein the image-forming element is flat and the projection surface forms a cylinder wall, wherein the optical means project a cylindrical illuminated image on the projection surface, and wherein the projection surface is manufactured from a transparent material such that an image projected onto the inside of the cylinder wall is visible on the outside of the cylinder wall, and wherein the image-forming element is coupled to a computer for control thereof.

2. The display device as claimed in claim 1, wherein the optical means comprise at least one reflector.

3. The display device as claimed in claim 2, wherein the reflector is conical-shaped.

4. The display device as claimed in claim 2, wherein the reflector is pyramid-shaped.

5. The display device as claimed in claim 2, wherein the reflector is disposed near an end of the cylinder wall.

6. The display device as claimed in claim 1, wherein the image-forming element is formed by a light passage screen, such as for instance a liquid crystal display.

7. The display device as claimed in claim 6, wherein the light passage screen is disposed between the light source and the optical means.

8. The display device as claimed in claim 1, wherein the image-forming element is formed by a reflection surface built up of a plurality of parts, which parts can be individually positioned, such as for instance a digital mirroring device.

9. The display device as claimed in claim 1, wherein the image-forming element, the light source and the optical means are all disposed substantially in the cylinder defined by the projection surface.

10. The display device as claimed in claim 1, wherein the optical means comprise a part of a reflecting sphere.

11. A display device for displaying visual information, comprising:

at least one image-forming element;

at least one light source for generating a light beam, which in cooperation with the image-forming element produces an illuminated image;

optical means for processing the illuminated image; and a projection surface for receiving the illuminated image, wherein the image-forming element is flat and the projection surface forms a cylinder wall, wherein the optical means project a cylindrical illuminated image on the projection surface, wherein the optical means comprise a part of a reflecting sphere, and wherein two mutually facing parts of reflecting spheres are disposed in a projection surface in the form of a cylinder shell and have central openings arranged therein for passage of the light cast by two projectors.

12. A display device for displaying visual information, comprising:

at least one image-forming element;

at least one light source for generating a light beam, which in cooperation with the image-forming element produces an illuminated image, optical means for processing the illuminated image; and a projection surface for receiving the illuminated image, wherein the image-forming element is flat and the projection surface forms a cylinder wall, wherein the optical means project a cylindrical illuminated image on the projection surface, and wherein the projection surface is formed by a cylinder shell-shaped Fresnel lens.

13. The display device as claimed in claim 12, wherein a diffuser screen is placed around the cylinder shell-shaped Fresnel lens.

14. The display device as claimed in claim 12, wherein the inner side of the cylinder shell-shaped Fresnel lens is smooth and covered with a high gain material.

15. The display device as claimed in claim 12, wherein a depolarizing element is placed between a projector and a part of a reflecting sphere.

16. The display device as claimed in claim 12, wherein an outer cylinder is placed around the projection surface in the form of a cylinder shell formed by the Fresnel lens.

17. The display device as claimed in claim 16, wherein the inner or outer side of the outer cylinder is provided with a lenticular structure.

* * * * *

UNITED STATES PATENT AND TRADEMARK OFFICE

CERTIFICATE OF CORRECTION

PATENT NO. : 6,644,816 B1 Page 1 of 1
DATED : November 11, 2003
INVENTOR(S) : Perra et al.

It is certified that error appears in the above-identified patent and that said Letters Patent is hereby corrected as shown below:

Title page,
Item [73], Assignee, "Evolution Technology N.V." should read -- Evolution Technology Patents N.V. --.
Item [56], References Cited, insert:

--FOREIGN PATENT DOCUMENTS

| | | | | |
|---|---|---|---|---|
| DE | 3741541 | A1 | 06/1989 | .......... G09F/13/04 |
| DE | 19606224 | A1 | 08/1997 | .......... G03B/21/16 |
| DE | 3923140 | A1 | 01/1991 | .......... G09F/9/35 |
| DE | 19500693 | A1 | 07/1996 | .......... G09F/19/18 --. |

Column 1,
Line 22, "cast be" should read -- can be --.

Column 4,
Lines 46-47, heading "Detailed Description Of The Preferred Embodiments In the Claims" should read -- Detailed Description of the Preferred Embodiments --.

Column 5,
Line 6, "sylinder wall" should read -- cylinder wall --.
Lines 36-37, "lower pat" should read -- lower part --.
Line 46, "surge 21" should read -- surface 21 --.

Signed and Sealed this

Twenty-seventh Day of April, 2004

Jon W. Dudas

JON W. DUDAS
*Acting Director of the United States Patent and Trademark Office*